United States Patent [19]

Nagira et al.

[11] Patent Number: 4,789,729

[45] Date of Patent: Dec. 6, 1988

[54] PROCESS FOR RECOVERING A POLYARYLENE SULFIDE

[75] Inventors: Nobuo Nagira, Shinnanyo; Toshikazu Kato; Hiroshi Inoue, both of Yokkaichi, all of Japan

[73] Assignees: Toso Corporation; Toso Susteel Co., Ltd., both of Japan

[21] Appl. No.: 125,667

[22] Filed: Nov. 25, 1987

[30] Foreign Application Priority Data

Nov. 25, 1986 [JP] Japan .................. 61-278785

[51] Int. Cl.$^4$ ............................................. C08G 75/16
[52] U.S. Cl. .................... 528/496; 528/388; 528/493; 528/494; 528/495; 528/501
[58] Field of Search ............... 528/496, 493, 494, 495, 528/501, 388

[56] References Cited

U.S. PATENT DOCUMENTS 3,478,000  11/1969  Saunders et al. ............... 260/79.1
3,687,907  8/1972   Crouch et al. ................... 260/79.1
4,415,729  11/1983  Scoggins et al. .................... 528/388

*Primary Examiner*—Harold D. Anderson
*Attorney, Agent, or Firm*—Sughrue, Mion, Zinn, Macpeak, and Seas

[57] ABSTRACT

A polyarylene sulfide having a low content of electrolytic ions is economically recovered from a mixture consisting mainly of polyarylene sulfide and an alkali metal halide which mixture is obtained by reacting a polyhalogenated aromatic compound and an alkali metal sulfide containing water in an organic polar solvent, by dehydrating the mixture by distillation, mixing the dehydrated mixture with a solvent which is a poor solvent for both polyarylene sulfide and alkali metal halide and which is soluble in the organic polar solvent to prepare a slurry consisting essentially of the polyarylene sulfide and the alkali metal halide, subjecting the slurry to solid-liquid separation, washing the resultant cake with the poor solvent, drying the cake, adding water to the cake to wash away the alkali metal halide through dissolution, and subjecting the slurry to solid-liquid separation to recover polyarylene sulfide. Such a polyarylene sulfide is particularly useful for use in electronic and electric components and molded articles such as films, sheets and fibers.

5 Claims, 1 Drawing Sheet

PROCESS FOR RECOVERING A POLYARYLENE SULFIDE

BACKGROUND OF THE INVENTION

1. Field of the Invention

This invention relates to a process for industrially advantageously recovering a polyarylene sulfide having a low content of electrolytic ions from a mixture obtained through a reaction between a polyhalogenated aromatic compound and an alkali metal sulfide containing water in an organic polar solvent. The polymer obtained by the process of the present invention is particularly useful for use in molded articles such as electronic and electric components and films, sheets and fibers.

2. Description of the Prior Art

Polyarylene sulfide is produced by carrying out a polycondensation reaction between a halogenated aromatic compound and an alkali metal sulfide in a water-soluble polar solvent having a high boiling point and in the presence of a small amount of water, the reaction being conducted under pressure and at a relatively high temperature, i.e., 200° to 280° C., at which the resulting polyarylene sulfide is melted. The product of the reaction is a slurry consisting of polyarylene sulfide, an alkali metal halide, water, a small amount of unreacted matter, an oligomer which is a low-molecular weight polyarylene sulfide, and the above-described solvent. Various processes for recovering polyarylene sulfide from the reaction mixture have been proposed. For example, U.S. Pat. No. 3,478,000 discloses a process wherein the reaction mixture is heated under reduced pressure to evaporate the solvent, water and the unreacted matter, and the separated powdery solid matter is mixed with water to elute the alkali metal halide and then dried to thereby recover polyarylene sulfide.

This process suffers, however, from the following problems. Organic polar solvents which are employed for reaction are generally expensive and must be evaporated substantially completely in the course of recovery through evaporation from the viewpoint of disposal of waste water. Since such solvents have high boiling points, heating must be carried out at high temperatures. Polyarylene sulfide which is recovered by such a prior art process has a relatively high content of electrolytic ions because electrolytic ions remaining in the polymer are not readily eluted by washing with water, a process which is carried out in the subsequent step. The amount of residual electrolytic ions is demanded to be reduced in specific uses, for example, when polyarylene sulfide is used as a sealing material for ICs.

According to another conventional process, the recovery is carried out under a vacuum in order to lower the heating temperature. However, since it is necessary to produce a high degree of vacuum, the cost of the evacuation equipment is high and the running cost is increased, and if the degree of vacuum is lowered, the recovery time is increased, and this leads to lowering of productivity. Thus, this process is not economical. Although the relationship between the recovery temperature and the difficulty of eluting electrolytic ions by means of water has not yet been clarified, it may be considered that, when polyarylene sulfide is exposed to high temperatures, minute irregularities on the surface of particles of polyarylene sulfide powder are smoothed and this leads to a reduction in the surface area and, at the same time, causes metal ions to be wrapped and held in the polymer.

U.S. Pat. No. 3,687,907 discloses a process wherein the reaction product is mixed with water which is a bad solvent for polyphenylene sulfide and the temperature of the mixture is lowered to prepare a polyphenylene sulfide slurry which is then filtered to recover polyphenylene sulfide. According to this process, chloroform or the like is added to the filtrate consisting of water having an alkali metal halide dissolved therein and an organic polar solvent to cause extractive distillation of the polar solvent, thereby recovering the solvent.

Although it is considered to be easy to extract electrolytic ions remaining in the polyphenylene sulfide with water through this process, as compared to the previous process, there is an increase in the cost of recovering the organic polar solvent remaining in the extraction residue consisting mainly of water and an alkali metal halide. More specifically if it is intended to recover the residual organic polar solvent by distillation, it is necessary to evaporate a large amount of water which has a lower boiling point and a greater latent heat in evaporation than those of the solvent, whereas, if it is intended to recover the residual organic polar solvent by extraction with chloroform or the like, it costs a great deal to install equipment for extracting the organic polar solvent from a liquid of low concentration, to run the equipment, and to conduct separation of the materials for reuse.

SUMMARY OF THE INVENTION

It is therefore an object of the present invention to provide a process for economically recovering a polyarylene sulfide having a low content of electrolytic ions.

Other objects and advantages of the present invention will become apparent to those skilled in the art from the following description and disclosure.

DETAILED DESCRIPTION OF THE PREFERRED EMBODIMENT

Figure 1:
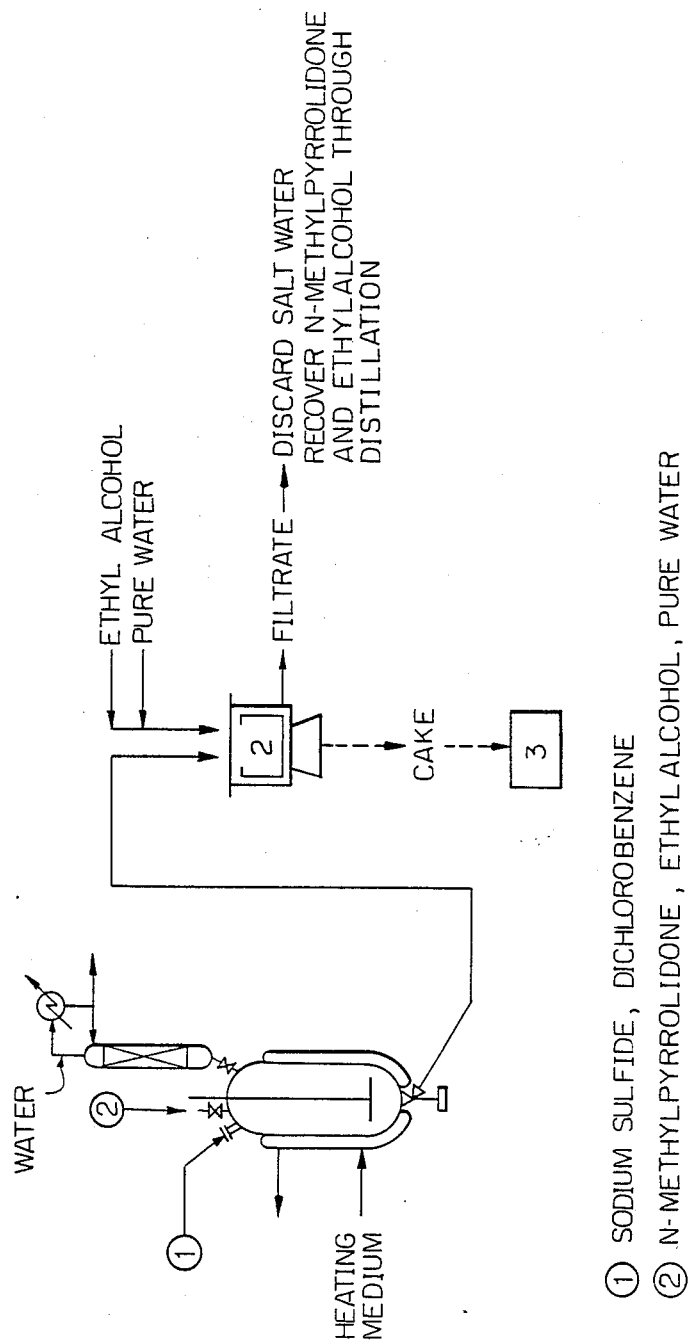
FIG. 1 is a flow sheet showing Example 1 of the present invention.

The present invention relates to a process for recovering a polyarylene sulfide from a mixture consisting mainly of polyarylene sulfide and an alkali metal halide which mixture is obtained by reacting a polyhalogenated aromatic compound and an alkali metal sulfide containing a small amount of water in an organic polar solvent, the process comprising the following steps:

(1) The step of dehydrating said mixture by distillation.

It is preferable from the viewpoint of energy cost to utilize the sensible heat of the reaction mixture for the energy required for the dehydration. The dehydration must be conducted to such an extent that no alkali metal halide is substantially dissolved in the reaction mixture. If the water is not substantially removed, the water and the alkali metal halide dissolved therein will undesirably be mixed with the filtrate obtained during the solid-liquid separation carried out in the subsequent step, resulting undesirably in deposition of the alkali metal halide in the distillation column and a lowering in the separation efficiency during the distillation of the mixture, which consists of the separated filtrate and a cake-washing solvent which is a bad solvent for both polyarylene sulfide and alkali metal halide and which is soluble in the organic polar solvent, carried out to separate and recover the bad solvent and the organic polar solvent (described later). In the dehydration by distillation, it is preferable to minimize the distillate of the organic polar solvent by giving an appropriate reflux ratio so that it is possible to omit the operation of recovering the organic polar solvent from the distilled water.

The dehydration by distillation may be conducted in a reaction vessel, or it is also possible to move the reaction mixture to another tank by, for example, utilizing the head difference in a state wherein pressure equalization has been reached, and then carry out the dehydration in this tank. It is also possible to move the reaction mixture to another tank by the use of the pressure in the reaction vessel and, at the same time, introduce part of the flashing steam from the tank to the distillation column to thereby carry out dehydration.

It should be noted that it is preferable, in the dehydration by distillation, to subsequently distill the unreacted polyhalogenated aromatic compound as much as possible with a view to facilitating the operation of separating and recovering the organic polar solvent (described later) and the operation of recovering the polyhalogenated aromatic compound (also described later).

It is also possible to recover by evaporation 90% or less of the organic polar solvent used in the reaction. If the recovery rate exceeds 90%, the amount of electrolytic ions remaining in the recovered polyarylene sulfide is unfavorably increased. It is preferable to set the recovery rate of the organic polar solvent at 80% or less from the viewpoint of the content of electrolytic ions in the recovered polyarylene sulfide.

(2) The step of mixing the dehydrated mixture with a solvent under stirring which is a poor (bad) solvent for both polyarylene sulfide and alkali metal halide and which is soluble in the organic polar solvent.

There is no specific restriction on the time at which this bad solvent is added. The bad solvent may be added either when polyarylene sulfide is in a dissolved state or when it has been separated out by cooling the dehydrated mixture to 230° to 200° C. or less. In the case where the bad solvent is added when polyarylene sulfide is in a dissolved state, if the polyarylene sulfide is still in the dissolved state after the addition of the solvent the mixture must be cooled below the separating point to form a slurry. The amount of the bad solvent added is usually in the range of 100 to 2000 parts by weight with respect to 100 parts by weight of polyarylene sulfide. An amount of bad solvent less than 100 parts by weight makes it difficult to form a transferable slurry and also makes it difficult to obtain a cake having a low liquid content in the solid-liquid separation and further unfavorably lowers the replacing efficiency in the operation wherein the cake is washed with the added bad solvent to replace the organic polar solvent in the cake with it. On the other hand, if the amount of the bad solvent exceeds 2000 parts by weight, it unfavorably costs a great deal to recover the bad solvent. Examples of the bad solvent usable in the present invention include methyl alcohol, ethyl alcohol, propyl alcohol, isopropyl alcohol, tetrahydrofuran, chloroform, acetone, etc.

(3) The step of subjecting the thus obtained slurry to solid-liquid separation.

The solid-liquid separation may be conducted by any means which is usually employed for industrial purposes, for example, centrifugal filtration, vacuum filtration, centrifugal settling, etc. Among them, centrifugal filtration is most preferable from the viewpoint of the time required for the solid-liquid separation and facilitation of the washing of the cake carried out in the subsequent step.

(4) The step of washing the cake obtained through the solid-liquid separation with the bad solvent previously added to form a slurry, substantially replaces the organic polar solvent still contained in the cake with the bad solvent.

The washing with the bad solvent may be conducted by any means. For example, it is possible to adopt a means wherein, after the bad solvent has been added to and mixed with the cake in a stirring tank, the mixture is subjected to repeated solid-liquid separation. However, it is convenient in terms of the arrangement and operation of the system and also economical to adopt a method wherein the bad solvent is poured over the cake on the filter cloth or filter medium after centrifugal filtration and this cake is then subjected to centrifugal washing. The higher the degree of replacement of the organic polar solvent with the bad solvent, the more preferable. It is desirable to reduce the amount of organic polar solvent remaining in the cake to 5 parts or less by weight with respect to 100 parts by weight of polyarylene sulfide. If the amount of residual organic polar solvent exceeds this level, much time is required to recover the organic polar solvent in the subsequent step, and if it is intended to reduce the recovery time, it is necessary to increase the recovery temperature, or the solvent must be discarded without being recovered, which does not follow the object of the present invention.

(5) The step of heating the cake washed with the bad solvent under stirring in a tank having a stirrer to evaporate the bad solvent and the residual organic polar solvent.

The heating is usually carried out by passing steam or hot water through a jacket. In this case, it is possible to maintain the inside of the tank under a vacuum by means of a vacuum pump in order to lower the internal temperature and introduce an inert gas such as $N_2$, or the like to encourage the evaporation of the solvents. A cake temperature higher than 140° C. lowers the efficiency of removing the residual electrolytic ions from the recovered polyarylene sulfide, resulting unfavorably in an increase in the time and energy required in the subsequent washing step.

(6) The step of placing the thus obtained solid which consists essentially of polyarylene sulfide and alkali metal halide in a tank having a stirrer, adding water thereto, and heating the water slurry with stirring.

Instead of heating the water slurry, another means, for example the pouring of hot water, may, of course, be adopted. The resultant slurry is subjected to solid-liquid separation to obtain a cake of polyarylene sulfide, and the operation in which water is added and solid-liquid separation is conducted is repeated according to need, thereby removing the residual alkali metal halide.

Preferable organic polar solvents usable in the present invention are aprotic polar solvents which are stable at high temperatures. Examples of them include urea, amides such as N,N-dimethylacetamide, N-ethyl-2-pyrrolidone, N-methyl-2-pyrrolidone, hexamethylphosphoramide, tetramethylurea, 1,3-dimethyl-2-imidazolidinone or the like, sulfolanes such as sulfolane, dimethyl sulfolane or the like, ketones such as methyl phenyl ketone or the like, and mixtures thereof.

Polyhalogenated aromatic compounds usable in the present invention are halogenated aromatic compounds in which two or more halogen atoms are bonded directly to the aromatic nucleus. Examples of them include p-dichlorobenzene, o-dichlorobenzene, diiodonaphthalene, dichlorobiphenyl, dibromobiphenyl, dichlorodiphenyl sulfone, dibromodiphenyl sulfone, diiododiphenyl sulfone, dichlorodiphenyl ether, diohlorobenzophenone, dibromobenzophenone, dichlorodiphenyl sulfide or the like, and mixtures thereof.

Alkali metal sulfides usable in the present invention include lithium sulfide, sodium sulfide, potassium sulfide, and mixtures thereof. An alkali metal hydrosulfide and an alkali metal hydroxide may be mixed to produce an alkali metal sulfide in situ.

EXAMPLES

The present invention will be explained more specifically below by way of Examples. However, the present invention is in no way restricted to these Examples.

EXAMPLE 1

In a stainless steel 15-liter autoclave were placed 4900 g of N-methylpyrrolidone and 1880 g of $Na_2S.2.6H_2O$. They were subjected to jacket heating with stirring, and dehydrated under refluxing with steam introduced to a distillation column attached to the autoclave. The dehydration was suspended when the internal temperature reached 200° C. By this operation, 370 g of a distillation consisting mainly of water was removed. Then, the system was cooled until the internal temperature was 170° C., and 2130 g of p-dichlorobenzene was added. The system was re-heated to 250° C. Polymerization was conducted for 3 hours at that temperature. After the completion of the polymerization, the reaction mixture was stirred, the remaining water and the unreacted dichlorobenzene were simultaneously distilled out by using the aforementioned distillation column. At this time, 590 g of a distillate were removed. The water content in this distillate was 58%. Subsequently, the reaction mixture was cooled to 100° C. and 3000 g of ethyl alcohol were added. The resultant slurry was placed in a centrifugal separator to separate it into a cake consisting mainly of polyphenylene sulfide, salt, N-methylpyrrolidone and ethyl alcohol and 6810 g of a filtrate consisting essentially of N-methylpyrrolidone and ethyl alcohol. The filtrate was subjected to distillation to separate a small amount of solid matter undesirably mixed therewith and polyphenylene sulfide oligomer so as to be reused. Then, with the centrifugal separator being rotated, 3000 g of ethyl alcohol was poured onto the cake layer to wash the latter, thereby replacing 97% of N-methylpyrrolidone in the cake with the alcohol. The filtrate was readily separated into alcohol and N-methylpyrrolidone in the distillation column so as to be reused.

The cake was returned to the autoclave where it was heated to 100° C. with stirring. Thus, 99.9% or more of ethyl alcohol contained in the cake was recovered through evaporation.

Then, 8000 g of pure water was poured onto the cake and the water slurry was then heated to 40° C. with stirring to dissolve the salt. This slurry was dehydrated in the centrifugal separator and then washed with water. The cake was returned to the autoclave, and 8000 g of water was poured onto the cake. The water slurry was heated with stirring for 30 minutes at 180° C. After being cooled, the slurry was dehydrated in the centrifugal separator and washed with water. The resultant cake was dried overnight with a hot-air drier to obtain 1470 g of polyphenylene sulfide. The sodium ion content in the thus obtained polyphenylene sulfide was 85 ppm.

EXAMPLE 2

The reaction mixture obtained in the same way as in Example 1 was subjected to distillation to remove the remaining water and the unreacted dichlorobenzene in the same manner as in Example 1. The distillation was further continued to distill out about 60% of the remaining N-methylpyrrolidone (2900 g). At this time, the internal temperature was 150° C. Thereafter, the procedure of Example 1 was repeated. The content of sodium ions in the thus obtained polyphenylene sulfide was 120 ppm.

EXAMPLE 3

The reaction mixture obtained in the same way as in Example 1 was subjected to distillation to remove the remaining water and the unreacted dichlorobenzene in the same manner as in Example 1. Subsequently, the reaction mixture was cooled to 120° C., and 3000 g of isopropyl alcohol were added. Thereafter, the procedure of Example 1 was repeated except that isopropyl alcohol was employed instead of ethyl alcohol. The content of sodium ions in the thus obtained polyphenylene sulfide was 96 ppm.

COMPARATIVE EXAMPLE 1

The reaction mixture obtained in the same way as in Example 1 was heated to 155° C. under a vacuum and with stirring, whereby the remaining water, unreacted dichlorobenzene and N-methylpyrrolidone serving as a solvent, were evaporated to obtain a solid powder consisting essentially of polyphenylene sulfide and salt. By this operation, 99% of the N-methylpyrrolidone was recovered through evaporation. To the solid powder, 8000 g of pure water was added and the water slurry was heated to 40° C. with stirring to dissolve the salt. The slurry was dehydrated in the centrifugal separator again and washed with water. The obtained cake was returned to the autoclave where 8000 g of pure water was poured on the cake and the water slurry was heated for 30 minutes at 180° C. with stirring. After being cooled, this slurry was dehydrated in the centrifugal separator and washed with water. The obtained cake was dried overnight by heating with a hot-air drier to obtain 1460 g of polyphenylene sulfide. The content of sodium ions in the thus obtained polyphenylene sulfide was 1900 ppm.

COMPARATIVE EXAMPLE 2

The operation in Comparative Example 1, in which 8000 g of pure water was poured onto the cake and the water slurry was heated for 30 minutes at 180° C. with stirring, and cooled, dehydrated in the centrifugal separator and then washed with water, was repeated four times. The content of sodium ions in the thus obtained polyphenylene sulfide was 800 ppm.

It should be noted that the content of sodium ions in the polymers shown in the Examples and Comparative Examples was measured by (a) subjecting about 0.5 g of a sample to wet decomposition with about 10 ml of nitric acid in a quartz beaker, (b) adding thereto pure (deionized) water to prepare a solution of a predetermined amount and then (c) subjecting the solution to atomic absorption spectrometry.

As is obvious from the above explanation, the present invention enables polyarylene sulfide having a low content of electrolytic ions to be industrially advantageously recovered from the reaction mixture.

What is claimed is:

1. A process for recovering a polyarylene sulfide from a mixture consisting mainly of polyarylene sulfide and an alkali metal halide which mixture is obtained by reacting a polyhalogenated aromatic compound and an alkali metal sulfide containing water in an organic polar solvent, said process comprising the steps of: dehydrating said mixture by distillation; mixing the dehydrated mixture with a solvent which is a poor solvent for both polyarylene sulfide and alkali metal halide and which is soluble in the organic polar solvent to prepare a slurry consisting essentially of the polyarylene sulfide and the alkali metal halide; subjecting said slurry to solid-liquid separation; washing the resultant cake with said poor solvent; drying said cake; adding water to said cake to wash away the alkali metal halide through dissolution; and subjecting the slurry to solid-liquid separation to recover polyarylene sulfide.

2. The process according to claim 1 wherein the poor solvent is added in the range of 100 to 2000 parts by weight with respect to 100 parts by weight of polyarylene sulfide to prepare a slurry consisting essentially of the polyarylene sulfide and the alkali metal halide.

3. The process acoording to claim 1 wherein the amount of organic polar solvent remaining in the cake is reduced 5 parts or less by weight with respect to 100 parts by weight of polyarylene sulfide by washing the cake with the poor solvent.

4. The process according to claim 1 wherein the drying of the cake is conducted at the cake temperature of 140° C. or lower to evaporate the poor solvent and the residual organic polar solvent therefrom.

5. The process according to claim 1 wherein the poor solvent is selected from the group consisting of methyl alcohol, ethyl alcohol, propyl alcohol, isopropyl alcohol, tetrahydrofuran, chloroform and acetone.

* * * * *